United States Patent
Nagai

(10) Patent No.: US 10,305,852 B2
(45) Date of Patent: May 28, 2019

(54) TELEPHONE SYSTEM, EXCHANGE, TELEPHONE EXCHANGING METHOD, AND TELEPHONE EXCHANGING PROGRAM

(71) Applicant: NEC Platforms, Ltd., Kawasaki-shi, Kanagawa (JP)

(72) Inventor: Kazuki Nagai, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/567,456

(22) PCT Filed: Sep. 30, 2016

(86) PCT No.: PCT/JP2016/079013
§ 371 (c)(1),
(2) Date: Oct. 18, 2017

(87) PCT Pub. No.: WO2017/057678
PCT Pub. Date: Apr. 6, 2017

(65) Prior Publication Data
US 2018/0295093 A1 Oct. 11, 2018

(30) Foreign Application Priority Data
Oct. 1, 2015 (JP) ................................. 2015-195758

(51) Int. Cl.
*H04M 3/00* (2006.01)
*H04M 7/00* (2006.01)
(Continued)

(52) U.S. Cl.
CPC ............ *H04L 61/106* (2013.01); *H04L 12/44* (2013.01); *H04L 12/66* (2013.01);
(Continued)

(58) Field of Classification Search
CPC ..... H04L 12/44; H04L 61/106; H04L 61/605; H04L 61/6022; H04L 65/1073;
(Continued)

(56) References Cited

U.S. PATENT DOCUMENTS 5,291,377 A * 3/1994 DiGiovanni ............ H04L 12/44
361/601
5,309,504 A * 5/1994 Morganstein ........... H04M 3/51
379/142.07

(Continued)

FOREIGN PATENT DOCUMENTS

EP 1750475 A2 2/2007
GB 2482441 A 2/2012
(Continued)

OTHER PUBLICATIONS

Communication dated Jan. 24, 2018 from the European Patent Office in counterpart European application No. 16851847.0.
(Continued)

*Primary Examiner* — Khai N. Nguyen
(74) *Attorney, Agent, or Firm* — Sughrue Mion, PLLC

(57) ABSTRACT

A system includes: a first telephone; a relay that manages first accommodation position information of the first telephone; and an exchange that includes a management table that manages second telephone identification information, second accommodation position information of a second telephone connected to the relay, and an extension number of each of a plurality of the second telephones, receives first telephone identification information and the first accommodation position information, when the first telephone identification information does not match with any one of the second telephone identification information registered, and the first accommodation position information matches with one of the second accommodation position information in the management table, changes second telephone identifi-
(Continued)

cation information corresponding to the matched second accommodation position information to the first telephone identification information, and uses an extension number corresponding to the matched second accommodation position information as an extension number of the first telephone.

8 Claims, 7 Drawing Sheets

(51) Int. Cl.

| | | |
|---|---|---|
| *H04L 29/12* | (2006.01) | |
| *H04L 12/44* | (2006.01) | |
| *H04Q 3/62* | (2006.01) | |
| *H04L 12/66* | (2006.01) | |
| *H04M 7/12* | (2006.01) | |
| *H04L 29/06* | (2006.01) | |
| *H04M 3/10* | (2006.01) | |
| *H04M 1/253* | (2006.01) | |

(52) U.S. Cl.
CPC ...... *H04L 65/1073* (2013.01); *H04M 7/0081* (2013.01); *H04M 7/125* (2013.01); *H04Q 3/62* (2013.01); *H04L 61/605* (2013.01); *H04L 61/6022* (2013.01); *H04L 2012/445* (2013.01); *H04M 1/2535* (2013.01); *H04M 3/10* (2013.01)

(58) Field of Classification Search
CPC ............ H04L 2012/445; H04M 1/723; H04M 1/2535; H04M 3/00; H04M 3/32; H04M 9/006
USPC .......................................... 379/220.01, 221.01
See application file for complete search history.

(56) References Cited

U.S. PATENT DOCUMENTS

| | | | | |
|---|---|---|---|---|
| 6,714,640 | B1* | 3/2004 | Yabe ................. | H04M 3/42314 370/496 |
| 2004/0120498 | A1* | 6/2004 | Sylvain ............... | H04L 12/6402 379/221.01 |
| 2004/0125923 | A1* | 7/2004 | See ..................... | H04L 12/4641 379/88.17 |
| 2004/0151165 | A1* | 8/2004 | Ezumi ................. | H04L 12/5692 370/352 |
| 2005/0143063 | A1* | 6/2005 | Mizutani ........... | H04M 3/42263 455/426.1 |

FOREIGN PATENT DOCUMENTS

| | | |
|---|---|---|
| JP | 2-262793 A | 10/1990 |
| JP | 6-311548 A | 11/1994 |
| JP | 2001-285476 A | 10/2001 |
| JP | 2005-318054 A | 11/2005 |
| JP | 2005-340885 A | 12/2005 |
| JP | 2010-108169 A | 5/2010 |
| JP | 2014-158091 A | 8/2014 |

OTHER PUBLICATIONS

Notification of Reasons for Refusal for Japanese Patent Application No. 2015-195758 dated Oct. 25, 2016.
International Search Report for PCT/JP2016/079013 dated Dec. 13, 2016 [PCT/ISA/210].

* cited by examiner

Fig. 3

TELEPHONE MANAGEMENT TABLE (BEFORE TELEPHONE EXCHANGE)

| TELEPHONE IDENTIFICATION INFORMATION | ACCOMMODATION POSITION INFORMATION | EXTENSION NUMBER | NOTE |
|---|---|---|---|
| MAC ADDRESS A | SWITCHING HUB IDENTIFICATION ID: A PORT NUMBER: X | 200 | |
| MAC ADDRESS B | SWITCHING HUB IDENTIFICATION ID: A PORT NUMBER: Y | 201 | |
| MAC ADDRESS C | SWITCHING HUB IDENTIFICATION ID: A PORT NUMBER: Z | 202 | |
| : | : | | |

TELEPHONE MANAGEMENT TABLE (AFTER TELEPHONE EXCHANGE)

| TELEPHONE IDENTIFICATION INFORMATION | ACCOMMODATION POSITION INFORMATION | EXTENSION NUMBER | NOTE |
|---|---|---|---|
| MAC ADDRESS D | SWITCHING HUB IDENTIFICATION ID: A PORT NUMBER: X | 200 | DATA OF TELEPHONE 20A-1 IS TAKEN OVER |
| MAC ADDRESS B | SWITCHING HUB IDENTIFICATION ID: A PORT NUMBER: Y | 201 | |
| MAC ADDRESS C | SWITCHING HUB IDENTIFICATION ID: A PORT NUMBER: Z | 202 | |
| : | : | | |

TELEPHONE SYSTEM, EXCHANGE, TELEPHONE EXCHANGING METHOD, AND TELEPHONE EXCHANGING PROGRAM

CROSS REFERENCE TO RELATED APPLICATIONS

This application is a National Stage of International Application No. PCT/JP2016/079013 filed Sep. 30, 2016, claiming priority based on Japanese Patent Application No. 2015-195758 filed Oct. 1, 2015, the contents of all of which are incorporated herein by reference in their entirety.

TECHNICAL FIELD

The present invention relates to a telephone system, an exchange, a telephone exchanging method and a telephone exchanging program. More particularly, the present invention relates to the telephone system, the exchange, the telephone exchanging method and the telephone exchanging program which transfer data during exchange of a telephone.

BACKGROUND ART

When an IP (Internet Protocol) telephone is exchanged due to a failure in an IP telephone exchange system, there is a case where the same extension number (additionally including one touch button settings, settings of a telephone book to use and the like) as that of the IP telephone before the exchange needs to be used for an operation. In this case, it is necessary to manually change a management table of the extension number and MAC addresses (Media Access Control addresses) of IP telephones managed inside an exchange.

Patent Literature 1 discloses a technique which relates to the present invention, and which, when a failed thin client terminal is changed to a maintenance terminal, an administrator user makes an instruction via a terminal replacement instruction screen transmitted from a management server to a management terminal to take over settings of a network device such as an IP address and a host name of the failed thin client terminal to a maintenance terminal.

CITATION LIST

Patent Literature

PTL 1: Japanese Unexamined Patent Application Publication No. 2010-108169 (paragraphs 0058 to 0064, 0097 and 0101)

SUMMARY OF INVENTION

Technical Problem

When an installation status is manually changed during installation of a telephone, a telephone system has difficulty in making a quick change, and requires an effort for the change.

An exemplary object of the present invention is to provide a telephone system, an exchange, a telephone exchanging method and a telephone exchanging program which can automatically identify telephone exchange and automatically rewrite necessary data for the telephone exchange.

Solution to Problem

A first aspect of the present invention is a telephone system that includes: a first telephone; a relay that is connected with the first telephone, and manages first accommodation position information of the connected first telephone; and an exchange that includes a management table that manages as a set at least second telephone identification information, second accommodation position information of a second telephone connected to the relay, and an extension number of each of a plurality of the second telephones, and in which the exchange receives a registration request including first telephone identification information and the first accommodation position information of the first telephone, searches in the management table based on the first telephone identification information and the first accommodation position information, and, when the first telephone identification information does not match with any one of pieces of the second telephone identification information registered in the management table, and the first accommodation position information matches with one of the pieces of the second accommodation position information registered in the management table, changes second telephone identification information that forms a set with the matched second accommodation position information, to the first telephone identification information in the management table, and uses an extension number that forms the set with the matched second accommodation position information as an extension number of the first telephone.

A second aspect of the present invention is a telephone system that includes: a first telephone; a relay that is connected with the first telephone, and manages first accommodation position information of the connected first telephone; and an exchange that includes a management table that manages as a set at least second telephone identification information, second accommodation position information of a second telephone connected to the relay, and an extension number of each of a plurality of the second telephones, and in which the exchange receives a registration request including first telephone identification information and the first accommodation position information of the first telephone, searches in the management table based on the first telephone identification information and the first accommodation position information, and, when the first telephone identification information matches with one of pieces of the second telephone identification information registered in the management table, and the first accommodation position information does not match with second accommodation position information that forms a set with the matched second telephone identification information, changes the second accommodation position information that forms the set with the matched second telephone identification information, to the first accommodation position information in the management table, and uses an extension number that forms the set with the matched second telephone identification information as an extension number of the first telephone.

A third aspect of the present invention is an exchange that includes: a communication interface that receives a registration request including first accommodation position information of a first telephone and first telephone identification information of the first telephone in a relay connected with the first telephone; a management table that manages as a set at least second telephone identification information, second accommodation position information of a second telephone connected to the relay, and an extension number of each of a plurality of the second telephones, a processing unit that, when the registration request is received, searches in the management table based on the first telephone identification information and the first accommodation position information, and, when the first telephone identification information does not match with any one of pieces of the second telephone identification information registered in the management table, and the first accommodation position information matches with one of the pieces of the second accommodation position information registered in the management table, changes second telephone identification information that forms a set with the matched second accommodation position information, to the first telephone identification information in the management table, and uses an extension number that forms the set with the matched second accommodation position information as an extension number of the first telephone.

A fourth aspect of the present invention is an exchange that includes: a communication interface that receives a registration request including first accommodation position information of a first telephone and first telephone identification information of the first telephone in a relay connected with the first telephone; a management table that manages as a set at least second telephone identification information, second accommodation position information of a second telephone connected to the relay, and an extension number of each of a plurality of the second telephones; and a processing unit that, when the registration request is received, searches in the management table based on the first telephone identification information and the first accommodation position information, and, when the first telephone identification information matches with one of pieces of the second telephone identification information registered in the management table, and the first accommodation position information does not match with second accommodation position information that forms a set with the matched second telephone identification information, changes the second accommodation position information that forms the set with the matched second telephone identification information, to the first accommodation position information in the management table, and uses an extension number that forms the set with the matched second telephone identification information as an extension number of the first telephone.

Fifth and sixth aspects of the present invention are a telephone exchanging method of the exchange of the telephone system according to the first and second aspects.

Seventh and eighth aspects of the present invention are a telephone exchanging program of a computer that is the exchange of the telephone system according to the first and second aspects.

Advantageous Effects of Invention

An exemplary effect of the present invention is to make it possible to decide a telephone installation status based on telephone identification information and accommodation position information notified from a telephone, and automatically transfer data during decision of telephone exchange, and make it unnecessary to manually change settings inside an exchange accompanying the telephone exchange.

BRIEF DESCRIPTION OF DRAWINGS

FIG. 3 is a view illustrating an example of a telephone management table.

DESCRIPTION OF EMBODIMENTS

One exemplary embodiment of the present invention will be described in detail below with reference to the drawings.

Figure 1:
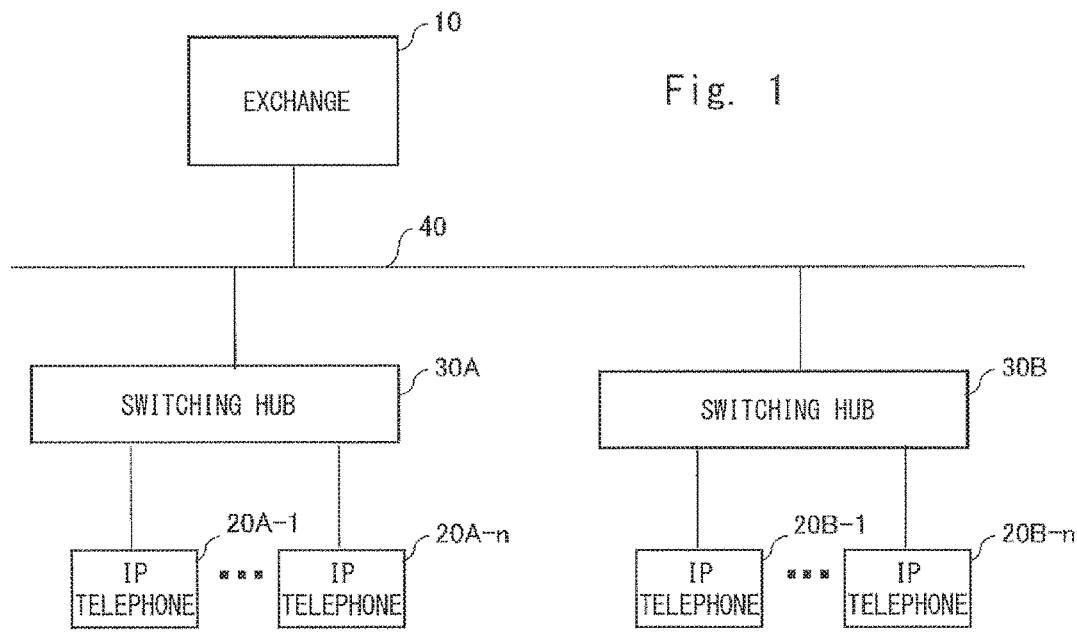
FIG. 1 is a block diagram illustrating a configuration of a telephone system according to one embodiment of the present invention.

A telephone system according to one embodiment of the present invention illustrated in FIG. 1 employs a VoIP (Voice over Internet Protocol) technique, and includes an exchange 10, IP telephones 20A-1 to 20A-n and 20B-1 to 20B-n (n is a natural number), and switching hubs 30A and 30B which are connected via a LAN line 40. The switching hubs 30A and 30B are relays. The two switching hubs are provided herein yet three or more switching hubs may be provided.

The switching hub 30A is connected with the IP telephones 20A-1 to 20A-n, and manages port numbers of ports connected with the IP telephones 20A-1 to 20A-n together with an identification ID (identification) of the switching hub 30A as accommodation position information. The switching hub 30B is connected with the IP telephones 20B-1 to 20B-n, and manages port numbers of ports connected with the IP telephones 20B-1 to 20B-n together with an identification ID of the switching hub 30B as accommodation position information. These pieces of accommodation position information are first accommodation position information.

Each of the IP telephones 20A-1 to 20A-n and 20B-1 to 20B-n notifies the exchange 10 of its own telephone identification information (first telephone identification information) and accommodation position information (first accommodation position information of a first telephone) obtained from the switching hub 30A or 30B during registration processing with respect to the exchange 10. The exchange 10 searches for telephone identification information and accommodation position information already registered in a telephone management table which is a management table based on the telephone identification information and the accommodation position information each of the IP telephones 20A-1 to 20A-n and 20B-1 to 20B-n has given a notification about, and decides a telephone installation status. The telephone identification information and the accommodation position information already registered in the telephone management table are second telephone identification information and second accommodation position information of the second telephone. Processing of deciding this telephone installation status will be described in detail below with reference to FIGS. 5 and 6.

Figure 2:
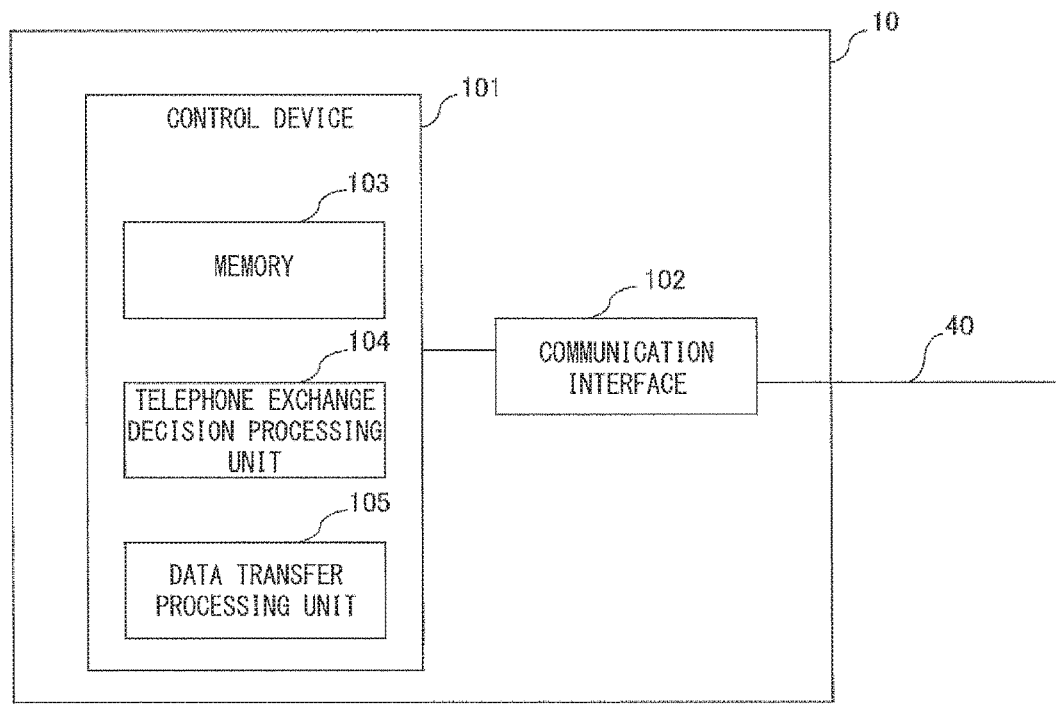
FIG. 2 is a block diagram illustrating one configuration example of an exchange.

As illustrated in, for example, FIG. 2, the exchange 10 includes a control device 101 and a communication interface 102, and the communication interface 102 is controlled by the control device 101. The control device 101 includes a memory 103, a telephone exchange decision processing unit 104 and a data transfer processing unit 105. Further, a timer may be provided in the data transfer processing unit 105 or may be provided separately from the data transfer processing unit 105. In this regard, the control device 101 has a processing unit which performs telephone exchange processing, yet it may include other processing units. For example, the exchange 10 performs telephone exchange processing of connecting with an external telephone via a public telephone line, yet the control device 101 may include a processing unit which performs this telephone exchange processing. The telephone exchange decision processing unit 104 performs processing of deciding a telephone installation status based on the telephone identification information and the accommodation position. This processing will be described in detail below with reference to FIG. 6. The data transfer processing unit 105 performs processing of asking the user whether or not to permit data transfer. This processing will be described in detail below with reference to FIG. 7.

As illustrated in, for example, FIG. 3, the memory 103 stores the telephone management table of the telephone identification information (e.g., MAC addresses) for identifying a telephone, the accommodation position information (switching hub identification IDs and port numbers) of telephones, and information (e.g., extension numbers) associated with the telephones. The telephone exchange decision processing unit 104 implemented in the control device 101 decides the telephone installation status by referring to the telephone identification information and the accommodation position information received from the IP telephone 20 and the telephone management table of the memory 103, and performs processing matching the installation state.

FIG. 3 illustrates examples of the telephone management tables respectively before IP telephone exchange and after the IP telephone exchange. FIG. 3 illustrates the telephone management table related to the switching hub 30A and the IP telephone connected with the switching hub 30A. The memory 103 of the exchange 10 holds the telephone management table related to the switching hub 30B and the IP telephone connected to the switching hub 30B. In the telephone management table, at least the telephone identification information, the accommodation position information and the extension number are managed as a set. In FIG. 3, a note is managed as a set.

In the telephone management table before the IP telephone exchange, MAC addresses A, B and C are registered as the telephone identification information (second telephone identification information) of the IP telephones 20A-1, 20A-2 and 20A-3, an identification ID "A" of the switching hub 30A and port numbers X, Y and Z connected with the IP telephones 20A-1, 20A-2 and 20A-3, respectively, are registered as the accommodation position information (second accommodation position information) of the IP telephones 20A-1, 20A-2 and 20A-3, and 200, 201 and 202 are registered as extension numbers of the IP telephones 20A-1, 20A-2 and 20A-3. In the telephone management table after the IP telephone exchange, a new IP telephone 20C different from the IP telephones illustrated in FIG. 1 is exchanged with the IP telephone 20A-1 and is registered. In the telephone management table after the IP telephone exchange, the MAC address A of the telephone identification information of the IP telephone 20A-1 is rewritten to a MAC address D of telephone identification information of the IP telephone 20C, and "DATA OF TELEPHONE 20A-1 IS TAKEN OVER" is registered in the note.

The telephone exchange decision processing unit 104 and the data transfer processing unit 105 are configured by hardware such as integrated circuits. The integrated circuits are LSIs (Large Scale Integrated circuit), ASICs (Application Specific Integrated Circuit), gate arrays, FPGAs (Field Programmable Gate Array), etc. When configured by the integrated circuits, the telephone exchange decision processing unit 104 and the data transfer processing unit 105 are respectively a telephone exchange decision processing circuit and a data transfer processing circuit. The timer may be provided in a data transfer processing circuit or may be provided separately from the data transfer processing circuit. The telephone exchange decision processing unit 104 and the data transfer processing unit 105 may be realized by software. In this case, the control device 101 includes a CPU (Central Processing Unit) which reads, interprets and executes a command of a control program in which operations of the telephone exchange decision processing unit 104 and the data transfer processing unit 105 are described in advance, a memory (a ROM or a RAM) or a hard disk in which this control program is stored, and a memory (RAM) which holds necessary data for computation processing of the CPU. Part of the memory 103 may be used for the memory (RAM) which holds the necessary data for the computation processing of the CPU. When the timer is provided, a function of the timer can be realized by the control program in which the operation of the data transfer processing unit 105 is described or another program may be configured by hardware such as a circuit.

Figure 4:
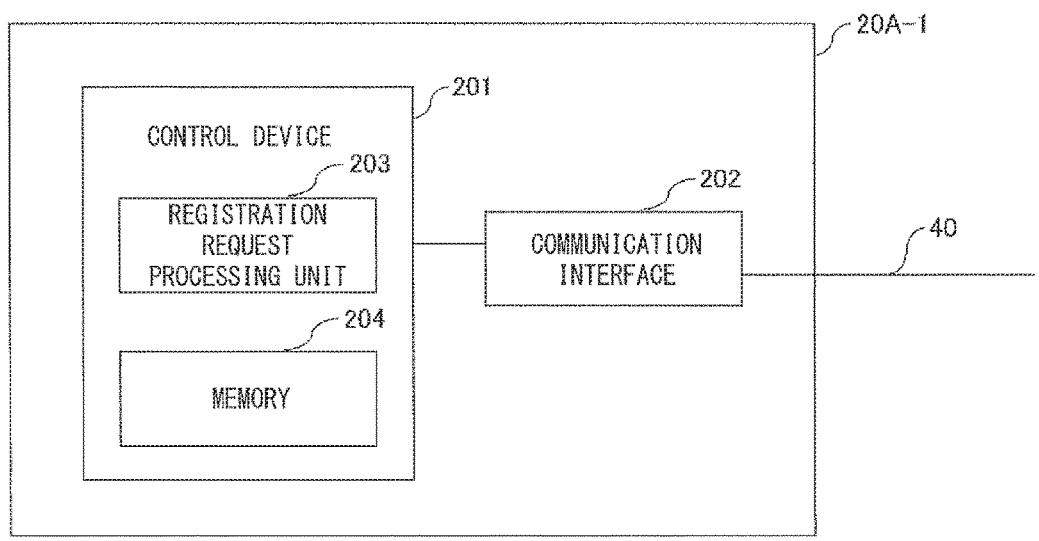
FIG. 4 is a block diagram illustrating one configuration example of an IP telephone.

As illustrated in, for example, FIG. 4, each of the IP telephones 20A-1 to 20A-n and 20B-1 to 20B-n includes a control device 201 and a communication interface 202, and the communication interface 202 is controlled by the control device 201. In this regard, FIG. 4 illustrates only a configuration of the IP telephone 20A-1. However, each of the IP telephones 20A-1 to 20A-n and 20B-1 to 20B-n also employs the same configuration. The control device 201 includes a registration request processing unit 203 which requests accommodation position information (a switching hub identification ID and a port number) from the switching hub 30A connected with the IP telephone 20A-1, obtains the accommodation position information, notifies the exchange 10 of its own telephone identification information and accommodation position information, and makes a registration request, and a memory 204 which stores its own telephone identification information (e.g., MAC address) and accommodation position information (a switching hub identification ID and a port number) of a telephone. In this regard, the control device 201 includes the registration request processing unit 203, yet it may include other processing units. For example, the IP telephone 20A-1 makes a call for another IP telephone via an extension line or the public telephone line. However, the control device 201 may include a processing unit which performs this call processing.

The registration request processing unit 203 is configured by hardware such as an integrated circuit. The integrated circuit is a LSI (Large Scale Integrated circuit), an ASIC (Application Specific Integrated Circuit), a gate array, a FPGA (Field Programmable Gate Array), etc. When configured by the integrated circuit, the registration request processing unit 203 is a registration request processing circuit. The registration request processing unit 203 may be realized by software. In this case, the control device 201 includes a CPU (Central Processing Unit) which reads, interprets and executes a command of a control program in which an operation of the registration request processing unit 203 is described in advance, a memory (a ROM or a RAM) or a hard disk in which this control program is stored, and a memory (RAM) which holds necessary data for computation processing of the CPU. Part of the memory 204 may be used for the memory (RAM) which holds the necessary data for the computation processing of the CPU.

The control device 201 has a function of obtaining information (a switching hub identification ID and a port number) which makes it possible to uniquely specify an accommodation position from a connected network device, according to a LLDP (Link Layer Discovery Protocol) or the like.

Each of the switching hubs 30A and 30B has a function of notifying the connected network device of the information (the switching hub identification ID and the port number) which makes it possible to uniquely specify the accommodation position, according to the LLDP.

(Explanation of Operation)

Figure 5:
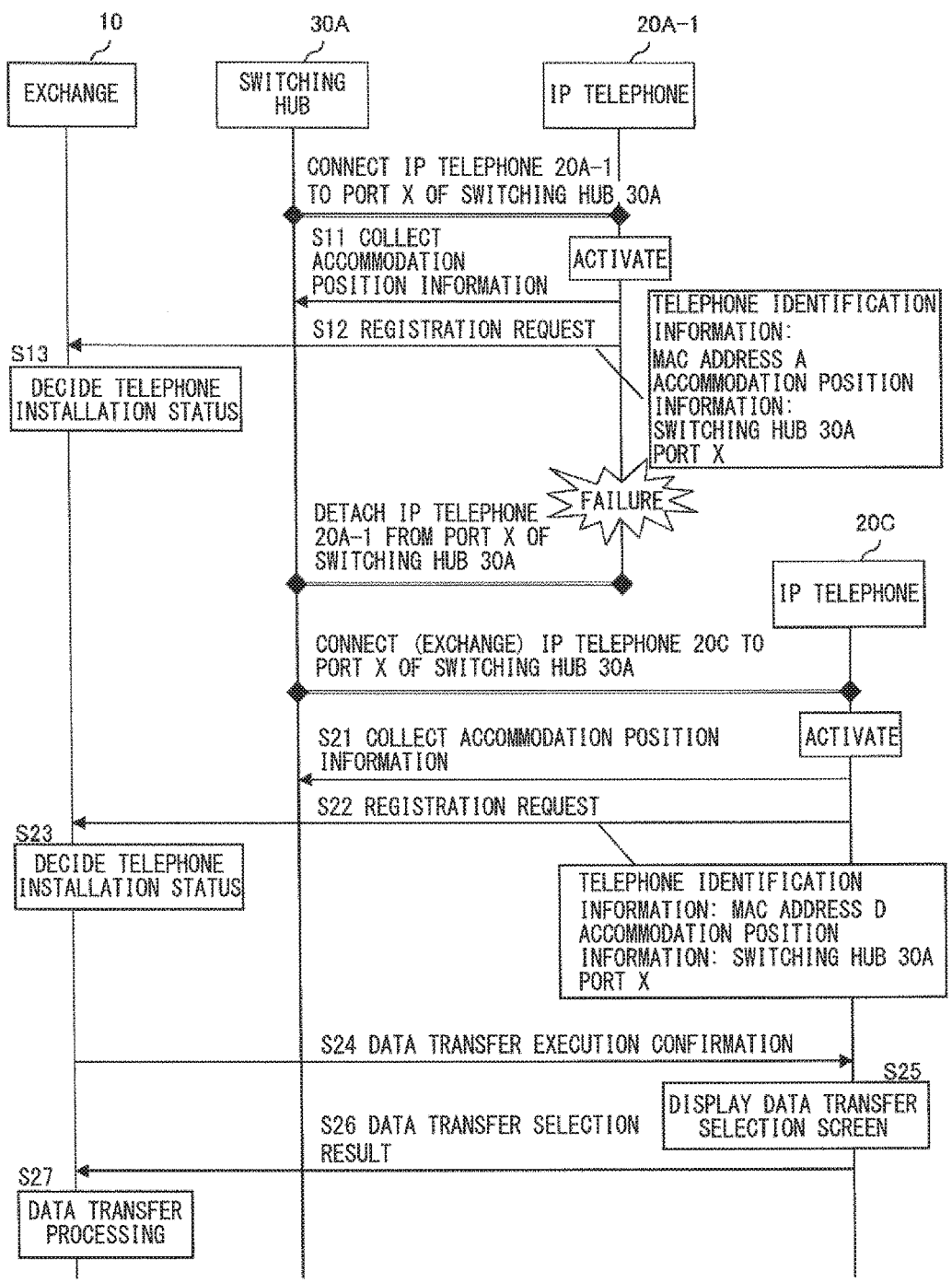
FIG. 5 is a sequence diagram of IP telephone exchange.
Figure 6:
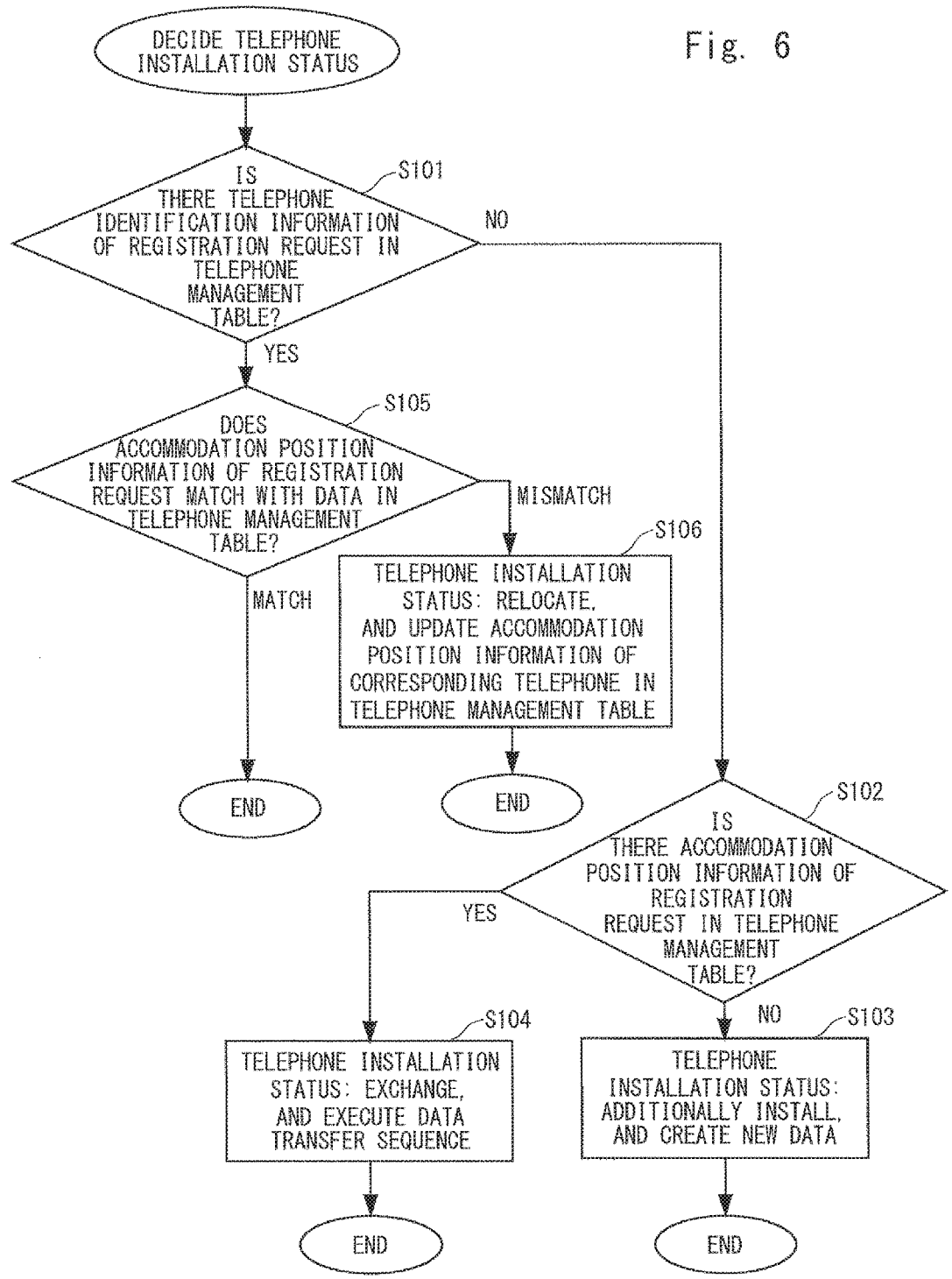
FIG. 6 is a flowchart of deciding a telephone installation status.
Figure 7:
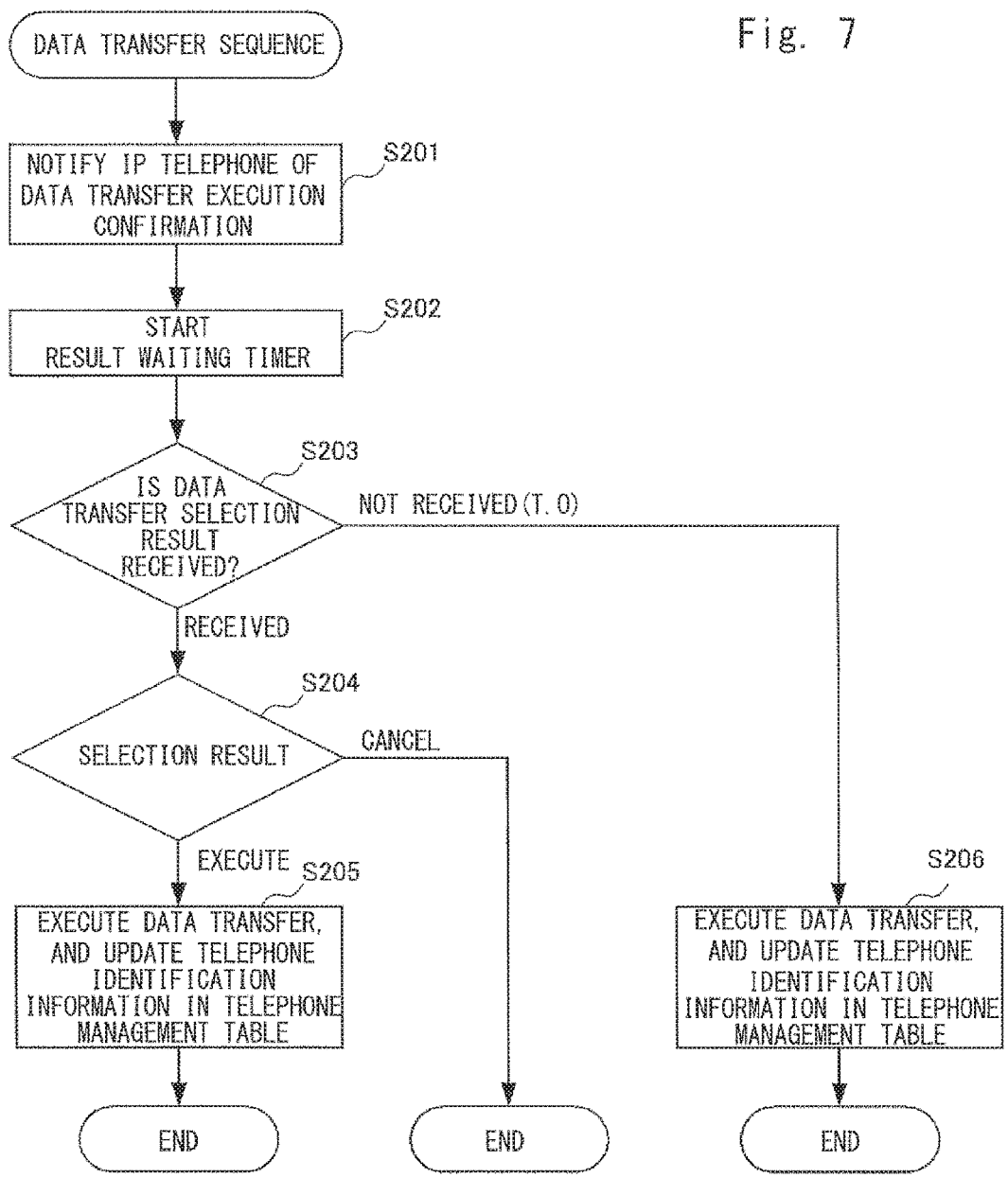
FIG. 7 is a flowchart illustrating a data transfer flow.

FIG. 5 is a sequence diagram of IP telephone exchange. FIG. 6 is a flowchart of deciding a telephone installation status. FIG. 7 is a flowchart illustrating a data transfer flow. Hereinafter, the IP telephone exchange sequence between the exchange 10, the switching hub 30A, and the IP telephones 20A-1 and 20C will be described as an example.

FIG. 5 assumes that the IP telephone 20A-1 is first newly connected to the port X of the switching hub 30A. Before the IP telephone 20A-1 is connected, another IP telephone is not connected to the port X, and the IP telephone 20A-1 is not connected to another port.

The IP telephone 20A-1 activates, requests accommodation position information (a switching hub identification ID and a port number) from the switching hub 30A connected at a time of activation by using the LLDP, and obtains the accommodation position information from the switching hub 30A by using the LLDP (step S11). The IP telephone 20A-1 having obtained the accommodation position information notifies the exchange 10 of its own telephone identification information (first telephone identification information) and accommodation position information (first accommodation position information) during registration processing with respect to the exchange 10, and makes a registration request (step S12).

The exchange 10 searches in the telephone management table (management table) based on the telephone identification information and the accommodation position information notified by the registration request from the IP telephone 20A-1, and decides a telephone installation status based on the telephone identification information, the accommodation position information and the information of the telephone management table (step S13). The telephone installation decision processing of the exchange 10 will be described with reference to FIG. 6.

The exchange 10 decides whether or not the telephone identification information of the registration request is in the telephone management table (whether or not the telephone identification information of the registration request matches with one of pieces of telephone identification information in the telephone management table) (step S101). The IP telephone 20A-1 is a newly connected telephone. Therefore, the exchange 10 decides that the telephone identification information is not in the telephone management table ("no" in step S101), and next decides whether or not the accommodation position information of the registration request is in the telephone management table (whether or not accommodation position information of the registration request matches with one of pieces of accommodation position information of the telephone management table) (step S102). No IP telephone is connected to the port X, and therefore the exchange 10 decides that the accommodation position information is not in the telephone management table ("no" in step S102). Further, the exchange 10 registers the telephone identification information (such as a MAC address) of the IP telephone 20A-1, the accommodation position information of the port X of the switching hub 30A and a new extension number in the telephone management table, and decides that it is necessary to create new data.

Thus, the exchange 10 decides to additionally install an IP telephone (step S103). After deciding to additionally install the IP telephone, the exchange 10 may make execution confirmation to the user as to whether or not to register the IP telephone in the telephone management table. The exchange 10 can make this execution confirmation similar to processing (execution confirmation processing described with reference to FIG. 7) from step S24 to step S27 described below. The telephone management table in a case where the IP telephone 20A-1 is additionally installed is the telephone identification table before the telephone exchange in FIG. 3. FIG. 3 assumes that the IP telephones 20A-1, 20A-2 and 20A-3 have already been registered.

Subsequently, as illustrated in FIG. 5, the IP telephone 20A-1 causes a failure and is detached from the port X, and instead the new IP telephone 20C which is not connected to another port is connected to the port X of the switching hub 30A and is replaced with the IP telephone 20A-1.

Subsequently, the IP telephone 20C activates, requests accommodation position information (a switching hub identification ID and a port number) from the switching hub 30A connected at a time of activation by using the LLDP, and obtains the accommodation position information from the switching hub 30A by using the LLDP (step S21). The IP telephone 20C having obtained the accommodation position information notifies the exchange 10 of the telephone identification information and the accommodation position information during registration processing with respect to the exchange 10, and makes a registration request (step S22).

The exchange 10 searches in the telephone management table (management table) based on the telephone identification information and the accommodation position information notified by the registration request from the IP telephone 20C, and decides a telephone installation status based on the telephone identification information, the accommodation position information and the information of the telephone management table. The telephone installation decision processing of the exchange 10 will be described with reference to FIG. 6.

The exchange 10 decides whether or not the telephone identification information of the registration request is in the telephone management table (whether or not the telephone identification information of the registration request matches with one of pieces of telephone identification information in the telephone management table) (step S101). The IP telephone 20C is a newly connected telephone. Therefore, the exchange 10 decides that the telephone identification information is not in the telephone management table ("no" in step S101), and next decides whether or not the accommodation position information of the registration request is in the telephone management table (whether or not accommodation position information of the registration request matches with one of pieces of accommodation position information of the telephone management table) (step S102). The IP telephone 20A-1 is connected to the port X, and therefore the exchange 10 decides that the accommodation position information of the registration request is in the telephone management table ("yes" in step S102). Further, the exchange 10 decides that the telephone identification information of the IP telephone which forms a set with the accommodation position information of the port X of the switching hub 30A needs to be changed from the IP telephone 20A-1 to the IP telephone 20C (a MAC address needs to be changed from A to D) in the telephone management table, i.e., decides that the IP telephone needs to be exchanged in the management table. In this case, the extension number 200 which forms a set with the port X is used for the extension number, and the extension number 200 allocated to the IP telephone 20A-1 is allocated to the new IP telephone 20C.

When deciding the telephone exchange in step S23, the exchange 10 notifies the IP telephone 20C of data transfer execution confirmation (step S24).

Figure 8:
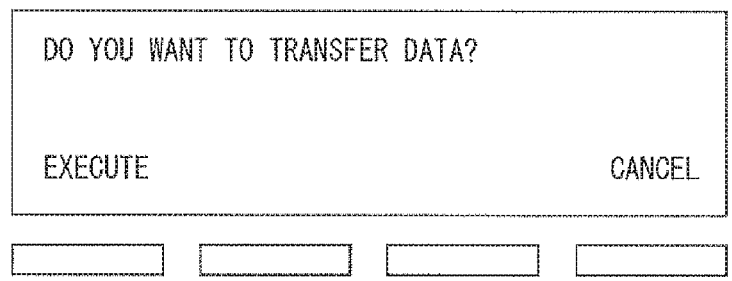
FIG. 8 is a view illustrating a screen displayed on an IP telephone.

When receiving the data transfer execution confirmation from the exchange 10, the IP telephone 20C displays, for example, a screen illustrated in FIG. 8, and makes the user select whether or not to execute data transfer (step S25).

The IP telephone 20C notifies the exchange 10 of a result inputted by the user as a data transfer selection result in step S26.

When notified of the data transfer execution as the data transfer selection result from the IP telephone 20C, the exchange 10 transfers data (step S27).

FIG. 7 illustrates a flowchart of processing from step S24 of notifying the data transfer execution confirmation of the exchange 10 to step S27 of performing data transfer processing.

When notifying the IP telephone 20C of the data transfer execution confirmation (step S201), the exchange 10 starts a result waiting timer (step S202).

The exchange 10 decides whether or not the notification of the data transfer selection result is received in a certain waiting time (step S203), and decides whether a selection result indicates data transfer execution or data transfer cancellation when receiving the notification (step S204). When the selection result indicates the data transfer execution, the exchange 10 rewrites the telephone identification information of the IP telephone of the accommodation position information of the port X of the switching hub 30A from IP telephone 20A-1 to the IP telephone 20C (rewrites the MAC address from A to D), and updates the telephone identification information (step S205).

When not receiving the notification of the data transfer selection result in the certain waiting time in step S203 ("not received" in step S203), the exchange 10 rewrites the telephone identification information of the IP telephone of the accommodation position information of the port X of the switching hub 30A from the IP telephone 20A-1 from IP telephone 20A-1 to the IP telephone 20C (rewrites the MAC address from A to D), and updates the telephone identification information (step S206). In this case, the extension number used by the IP telephone 20A-1 is taken over as an extension number to the IP telephone 20C.

In step S204, the exchange 10 finishes processing when the selection result indicates the data transfer cancellation.

In this regard, a case where, when the IP telephone 20A-1 is repaired and recovered from the failure, and the failure does not cause exchange, the detached IP telephone 20A-1 is connected to another port and a registration request is made to the exchange 10 will be described with reference to FIG. 6. The telephone identification information of the IP telephone 20A-1 of the telephone management table is rewritten to the telephone identification information of the IP telephone 20C. Therefore, the exchange 10 decides that the telephone identification information of the registration request is not in the telephone management table ("no" in step S101), decides whether or not an accommodation position information of the registration request is in the telephone management table, and moves to step S103 or S104. The telephone identification information which forms a set with another port is the telephone identification information (MAC address A) of the IP telephone 20A-1, and a new extension number is allocated as the extension number of the IP telephone 20A-1 in a case of step S103 and an extension number which forms a set with this another port is allocated in a case of step S104. The extension number which the IP telephone 20A-1 has used so far is used by the IP telephone 20C and therefore cannot be used.

As described above, when causing a failure, the IP telephone 20A-1 has been replaced with the new IP telephone 20C which is not connected to another port instead. Hereinafter, a case where the IP telephone 20A-1 is replaced with the IP telephone 20A-3 connected to the other port Z instead will be described.

In this case, the IP telephone 20A-3 is detached from the port Z of the switching hub 30A, and is connected to the port X. Processing of making a request for the accommodation position information to the switching hub 30A to the telephone installation status decision processing of the exchange 10 is the same as in a case where the IP telephone 20A-1 is replaced with the new IP telephone 20C described with reference to FIG. 5.

As illustrated in FIG. 6, when receiving telephone identification information (first telephone identification information) and accommodation position information (first accommodation position information) of the IP telephone 20A-3, the exchange 10 searches in the telephone management table (management table) based on these telephone identification information and accommodation position information, and decides whether or not the telephone identification information of the registration request is in the telephone management table (whether or not the telephone identification information of the registration request matches with one of pieces of telephone identification information in the telephone management table) (step S101). The IP telephone 20A-3 is connected to the other port Z, and therefore the exchange 10 decides that the telephone identification information of the registration request is in the telephone management table ("yes" in step S101). Next, the exchange 10 decides whether or not the accommodation position information of the IP telephone 20A-3 in the registration request matches with data in the telephone management table (step S105). The IP telephone 20A-3 is registered in association with the port Z in the telephone management table, and therefore the exchange 10 decides that the accommodation position information does not match with the data ("mismatch" in step S105). The exchange 10 decides that a port number of the accommodation position information of the IP telephone 20A-3 needs to be changed from Z to X (step S106). In this case, this port number overlaps the registered port number X of the IP telephone 20A-1, and therefore the exchange 10 decides that the registered port number X of the IP telephone 20A-1 needs to be deleted. The extension number 202 in a case where the IP telephone 20A-3 is connected to the other port Z is used for an extension number. Processing from step S24 of notifying the data transfer execution confirmation of the exchange 10 to step S27 of performing the data transfer processing is the same as the processing already described with reference to FIG. 7.

Hereinafter, a case where a new IP telephone 20D is connected to the other port Z of the switching hub 30 from which the IP telephone 20A-3 has been detached, and a registration request is made to the exchange 10 will be described with reference to Fig .6. The exchange 10 decides that telephone identification information of the IP telephone 20D in a registration request is not in the telephone management table ("no" in step S101), decides whether or not an accommodation position information of the registration request is in the telephone management table (whether or not accommodation position information of the registration request matches with data in the telephone management table) (step S102), decides that the accommodation position information of the registration request is not in the telephone management table since the registered port number of the IP telephone 20A-3 is changed from Z to X ("no" in step S102), and moves to step S103. A new extension number is allocated as an extension number. The extension number which the IP telephone 20A-3 has used so far for the port Z is used by the port X, and therefore cannot be used.

In FIG. 6, the exchange 10 decides whether or not telephone identification information of a registration request is in the telephone management table in step S101, then moves to steps S105 and S102, and decides whether or not accommodation position information of the registration request is in the telephone management table (whether or not the accommodation position information of the registration request matches with data in the telephone management table). However, the exchange 10 may decide whether or not the accommodation position information of the registration request is in the telephone management table (whether or not the accommodation position information of the registration request matches with the data in the telephone management table), and then decide whether or not the telephone identification information of the registration request is in the telephone management table in cases where the accommodation position information is and is not in the telephone management table.

Further, as illustrated in FIG. 5, the IP telephones 20A-1 and 20C make registration requests to the exchange 10. However, when detecting connection of the IP telephone 20A-1 or the IP telephone 20C, the switching hub 30A may obtain the telephone identification information from the IP telephone 20A-1 or the IP telephone 20C and send the registration request to the exchange 10. Further, when the exchange 10 sends a confirmation signal to the switching hubs 30A and 30B on a regular basis or on an irregular basis and the switching hub 30A detects connection with the IP telephone 20A-1 or the IP telephone 20C, the switching hub 30A may obtain the telephone identification information from the IP telephone 20A-1 or the IP telephone 20C and send the registration request to the exchange 10. Furthermore, when a management device is connected to the LAN line 40 between the exchange 10 and the switching hubs 30A and 30B, the management device sends a confirmation signal to the switching hubs 30A and 30B on a regular basis or on an irregular basis, and the switching hub 30A detects connection to the IP telephone 20A-1 or the IP telephone 20C, the management device may receive telephone identification information and accommodation position information from the switching hub 30A and send the registration request to the exchange 10.

Registration and rewriting of the telephone management table during the above-described telephone exchange in the telephone system are as follows.

(1) When a new IP telephone is connected to an unconnected port (a port of a relay such as a switching hub) (additional installation), a MAC address of the IP telephone is registered together with the accommodation position information (a relay identification ID and a port number), and a new extension number is allocated to this IP telephone.

(2) When a connected IP telephone is detached and is connected to a different port (relocation), an extension number which has been allocated so far is continuously allocated to this IP telephone (accommodation position information is updated).

(3) When a new IP telephone is connected to a port from which a connected IP telephone has been detached (exchange), a MAC address of the new IP telephone is registered together with accommodation position information, and an extension number which has been allocated to an IP telephone connected so far is allocated to the new IP telephone.

(4) When the IP telephone detached in above (3) is connected to another port, the extension number which has been used so far is used by the another IP telephone attached in above (3), and therefore a new extension number or an extension number which forms a set with the another port is allocated (the accommodation position information is also updated).

(5) When a new IP telephone is connected to the port from which the IP telephone in above (2) has been detached, MAC address information is registered together with the accommodation position information, and a new extension number is allocated to this new IP telephone (an extension number which has been used so far is used by an IP telephone relocated to another port).

Further, the telephone exchanging program according to the present invention can be stored by using various types of non-transitory computer readable media, and be supplied to computers. The non-transitory computer readable media include various types of tangible storage media. The non-transitory computer readable media include, for example, magnetic recording media (e.g., flexible disks, magnetic tapes and hard disk drives), magnetooptical recording media (e.g., optical magnetic disks), CD-ROMs (Read Only Memory), CD-Rs, CD-R/Ws and semiconductor memories (e.g., mask ROMs, PROMs (Programmable ROM), EPROMs (Erasable PROM), flash ROMs and RAMs (Random Access Memory)). Further, the programs may be supplied to the computers via various types of transitory computer readable media. The transitory computer readable media include, for example, electrical signals, optical signals and electromagnetic waves. The transitory computer readable media can supply the programs to the computers via wired communication channels such as electrical cables or optical fibers or wireless communication channels.

The configuration of the preferred embodiment of the present invention has been described above. However, it should be noted that this embodiment is simply an exemplary embodiment of the present invention and by no means limits the present invention. One of ordinary skill in the art can easily understand that it is possible to make various deformations and changes according to specific usage without departing from the scope of the present invention.

This application claims priority to Japanese Patent Application No. 2015-195758 filed on Oct. 1, 2015, the entire contents of which are incorporated by reference in the description of this application.

Part of entirety of the embodiment may be as described in the following supplementary notes yet is not limited to the following configuration.

(Supplementary Note 1)

A telephone system includes:

a first telephone;

a relay that is connected with the first telephone, and manages first accommodation position information of the connected first telephone; and an exchange that includes a management table that manages as a set at least second telephone identification information, second accommodation position information of a second telephone connected to the relay, and an extension number of each of a plurality of the second telephones, and the exchange receives a registration request including first telephone identification information and the first accommodation position information of the first telephone, searches in the management table based on the first telephone identification information and the first accommodation position information, and, when the first telephone identification information does not match with any one of pieces of the second telephone identification information registered in the management table, and the first accommodation position information matches with one of the pieces of the second accommodation position information registered in the management table, changes second telephone identification information that forms a set with the matched second accommodation position information, to the first telephone identification information in the management table, and uses an extension number that forms the set with the matched second accommodation position information as an extension number of the first telephone.

(Supplementary Note 2)

A telephone system includes:

a first telephone;

a relay that is connected with the first telephone, and manages first accommodation position information of the connected first telephone; and an exchange that includes a management table that manages as a set at least second telephone identification information, second accommodation position information of a second telephone connected to the relay, and an extension number of each of a plurality of the second telephones, and the exchange receives a registration request including first telephone identification information and the first accommodation position information of the first telephone, searches in the management table based on the first telephone identification information and the first accommodation position information, and, when the first telephone identification information matches with one of pieces of the second telephone identification information registered in the management table, and the first accommodation position information does not match with the second accommodation position information that forms a set with the matched second telephone identification information, changes the second accommodation position information that forms the set with the matched second telephone identification information, to the first accommodation position information in the management table, and uses an extension number that forms the set with the matched second telephone identification information as an extension number of the first telephone.

(Supplementary Note 3)

A telephone system includes:

a first telephone;

a relay that is connected with the first telephone, and manages first accommodation position information of the connected first telephone; and an exchange that includes a management table that manages as a set at least second telephone identification information, second accommodation position information of a second telephone connected to the relay, and an extension number of each of a plurality of the second telephones, and the exchange receives a registration request including first telephone identification information and the first accommodation position information of the first telephone, and searches in the management table based on the first telephone identification information and the first accommodation position information, when the first telephone identification information does not match with any one of pieces of the second telephone identification information registered in the management table, and the first accommodation position information matches with one of the pieces of the second accommodation position information registered in the management table, the exchange changes second telephone identification information that forms a set with the matched second accommodation position information, to the first telephone identification information in the management table, and uses an extension number that forms the set with the matched second accommodation position information as an extension number of the first telephone, and, when the first telephone identification information matches with one of pieces of the second telephone identification information registered in the management table, and the first accommodation position information does not match with second accommodation position information that forms a set with the matched second telephone identification information, the exchange changes the second accommodation position information that forms the set with the matched second telephone identification information, to the first accommodation position information in the management table, and uses an extension number that forms the set with the matched second telephone identification information as an extension number of the first telephone.

(Supplementary Note 4)

The telephone system according to Supplementary Note 1 or 3, before the second telephone identification information that forms the set with the matched second accommodation position information is changed to the first telephone identification information, an execution confirmation notification of data transfer is made to the first telephone, and, when a response to execution of the data transfer is received, the second telephone identification information is changed to the first telephone identification information.

(Supplementary Note 5)

The telephone system according to Supplementary Note 2 or 3, before the second accommodation position information that forms the set with the matched second telephone identification information is changed to the first accommodation position information, an execution confirmation notification of data transfer is made to the first telephone, and, when a response to execution of the data transfer is received, the second accommodation position information is changed to the first accommodation position information.

(Supplementary Note 6)

A telephone exchanging method of an exchange of a telephone system that includes:

a first telephone;

a relay that is connected with the first telephone, and manages first accommodation position information of the connected first telephone; and the exchange that includes a management table that manages as a set at least second telephone identification information, second accommodation position information of a second telephone connected to the relay, and an extension number of each of a plurality of the second telephones, includes at the exchange:

receiving a registration request including first telephone identification information and the first accommodation position information of the first telephone;

searching in the management table based on the first telephone identification information and the first accommodation position information; and when the first telephone identification information does not match with any one of pieces of the second telephone identification information registered in the management table, and the first accommodation position information matches with one of the pieces of the second accommodation position information registered in the management table, changing second telephone identification information that forms a set with the matched second accommodation position information, to the first telephone identification information in the management table, and using an extension number that forms the set with the matched second accommodation position information as an extension number of the first telephone.

(Supplementary Note 7)

A telephone exchanging method of an exchange of a telephone system that includes:

a first telephone;

a relay that is connected with the first telephone, and manages first accommodation position information of the connected first telephone; and the exchange that includes a management table that manages as a set at least second telephone identification information, second accommodation position information of a second telephone connected to the relay, and an extension number of each of a plurality of the second telephones, includes at the exchange:

receiving a registration request including first telephone identification information and the first accommodation position information of the first telephone;

searching in the management table based on the first telephone identification information and the first accommodation position information; and when the first telephone identification information matches with one of pieces of the second telephone identification information registered in the management table, and the first accommodation position information does not match with second accommodation position information that forms a set with the matched second telephone identification information, changing the second accommodation position information that forms the set with the matched second telephone identification information, to the first accommodation position information in the management table, and using an extension number that forms the set with the matched second telephone identification information as an extension number of the first telephone.

(Supplementary Note 8)

A telephone exchanging method of an exchange of a telephone system that includes:

a first telephone;

a relay that is connected with the first telephone, and manages first accommodation position information of the connected first telephone; and the exchange that includes a management table that manages as a set at least second telephone identification information, second accommodation position information of a second telephone connected to the relay, and an extension number of each of a plurality of the second telephones, includes at the exchange:

receiving a registration request including first telephone identification information and the first accommodation position information of the first telephone;

searching in the management table based on the first telephone identification information and the first accommodation position information;

when the first telephone identification information does not match with any one of pieces of the second telephone identification information registered in the management table, and the first accommodation position information matches with one of the pieces of the second accommodation position information registered in the management table, changing second telephone identification information that forms a set with the matched second accommodation position information, to the first telephone identification information in the management table, and using an extension number that forms the set with the matched second accommodation position information as an extension number of the first telephone; and when the first telephone identification information matches with one of pieces of the second telephone identification information registered in the management table, and the first accommodation position information does not match with second accommodation position information that forms a set with the matched second telephone identification information, changing the second accommodation position information that forms the set with the matched second telephone identification information, to the first accommodation position information in the management table, and using an extension number that forms the set with the matched second telephone identification information as an extension number of the first telephone.

(Supplementary Note 9)

The telephone exchanging method according to Supplementary Note 6 or 8, before the second telephone identification information that forms the set with the matched second accommodation position information is changed to the first telephone identification information, an execution confirmation notification of data transfer is made to the first telephone, and, when a response to execution of the data transfer is received, the second telephone identification information is changed to the first telephone identification information.

(Supplementary Note 10)

The telephone exchanging method according to Supplementary Note 7 or 8, before the second accommodation position information that forms the set with the matched second telephone identification information is changed to the first accommodation position information, an execution confirmation notification of data transfer is made to the first telephone, and, when a response to execution of the data transfer is received, the second accommodation position information is changed to the first accommodation position information.

(Supplementary Note 11)

An exchange includes:

a communication interface that receives a registration request including first accommodation position information of a first telephone and first telephone identification information of the first telephone in a relay connected with the first telephone;

a management table that manages as a set at least second telephone identification information, second accommodation position information of a second telephone connected to the relay, and an extension number of each of a plurality of the second telephones; and a processing unit that, when the registration request is received, searches in the management table based on the first telephone identification information and the first accommodation position information, and, when the first telephone identification information does not match with any one of pieces of the second telephone identification information registered in the management table, and the first accommodation position information matches with one of the pieces of the second accommodation position information registered in the management table, changes second telephone identification information that forms a set with the matched second accommodation position information, to the first telephone identification information in the management table, and uses an extension number that forms the set with the matched second accommodation position information as an extension number of the first telephone.

(Supplementary Note 12)

An exchange includes:

a communication interface that receives a registration request including first accommodation position information of a first telephone and first telephone identification information of the first telephone in a relay connected with the first telephone;

a management table that manages as a set at least second telephone identification information, second accommodation position information of a second telephone connected to the relay, and an extension number of each of a plurality of the second telephones; and a processing unit that, when the registration request is received, searches in the management table based on the first telephone identification information and the first accommodation position information, and, when the first telephone identification information matches with one of pieces of the second telephone identification information registered in the management table, and the first accommodation position information does not match with second accommodation position information that forms a set with the matched second telephone identification information, changes the second accommodation position information that forms the set with the matched second telephone identification information, to the first accommodation position information in the management table, and uses an extension number that forms the set with the matched second telephone identification information as an extension number of the first telephone.

(Supplementary Note 13)

An exchange includes:

a communication interface that receives a registration request including first accommodation position information of a first telephone and first telephone identification information of the first telephone in a relay connected with the first telephone;

a management table that manages as a set at least second telephone identification information, second accommodation position information of a second telephone connected to the relay, and an extension number of each of a plurality of the second telephones; and a processing unit that, when the registration request is received, searches in the management table based on the first telephone identification information and the first accommodation position information, and, when the first telephone identification information does not match with any one of pieces of the second telephone identification information registered in the management table, and the first accommodation position information matches with one of the pieces of the second accommodation position information registered in the management table, the processing unit changes second telephone identification information that forms a set with the matched second accommodation position information, to the first telephone identification information in the management table, and uses an extension number that forms the set with the matched second accommodation position information as an extension number of the first telephone, and, when the first telephone identification information matches with one of pieces of the second telephone identification information registered in the management table, and the first accommodation position information does not match with second accommodation position information that forms a set with the matched second telephone identification information, the processing unit changes the second accommodation position information that forms the set with the matched second telephone identification information, to the first accommodation position information in the management table, and uses an extension number that forms the set with the matched second telephone identification information as an extension number of the first telephone.

(Supplementary Note 14)

The exchange according to Supplementary Note 11 or 13, before the second telephone identification information that forms the set with the matched second accommodation position information is changed to the first telephone identification information, an execution confirmation notification of data transfer is made to the first telephone, and, when a response to execution of the data transfer is received, the second telephone identification information is changed to the first telephone identification information.

(Supplementary Note 15)

The exchange according to Supplementary Note 12 or 13, before the second accommodation position information that forms the set with the matched second telephone identification information is changed to the first accommodation position information, an execution confirmation notification of data transfer is made to the first telephone, and, when a response to execution of the data transfer is received, the second accommodation position information is changed to the first accommodation position information.

(Supplementary Note 16)

A telephone exchanging program causes a computer that is an exchange to execute:

receiving a registration request including first accommodation position information of a first telephone and first telephone identification information of the first telephone in a relay connected with the first telephone;

searching in a management table based on the first telephone identification information and the first accommodation position information, wherein the management table manages as a set at least second telephone identification information, second accommodation position information of a second telephone connected to the relay, and an extension number of each of a plurality of the second telephones; and when the first telephone identification information does not match with any one of pieces of the second telephone identification information registered in the management table, and the first accommodation position information matches with one of the pieces of the second accommodation position information registered in the management table, changing second telephone identification information that forms a set with the matched second accommodation position information, to the first telephone identification information in the management table, and using an extension number that forms the set with the matched second accommodation position information as an extension number of the first telephone.

(Supplementary Note 17)

A telephone exchanging program causes a computer that is an exchange to execute:

receiving a registration request including first accommodation position information of a first telephone and first telephone identification information of the first telephone in a relay connected with the first telephone;

searching in a management table based on the first telephone identification information and the first accommodation position information, wherein the management table manages as a set at least second telephone identification information, second accommodation position information of a second telephone connected to the relay, and an extension number of each of a plurality of the second telephones; and when the first telephone identification information matches with one of pieces of the second telephone identification information registered in the management table, and the first accommodation position information does not match with the second accommodation position information that forms a set with the matched second telephone identification information, changing the second accommodation position information that forms the set with the matched second telephone identification information, to the first accommodation position information in the management table, and using an extension number that forms the set with the matched second telephone identification information as an extension number of the first telephone.

(Supplementary Note 18)

A telephone exchanging program causes a computer that is an exchange to execute:

receiving a registration request including first accommodation position information of a first telephone and first telephone identification information of the first telephone in a relay connected with the first telephone;

searching in a management table based on the first telephone identification information and the first accommodation position information, wherein the management table manages as a set at least second telephone identification information, second accommodation position information of a second telephone connected to the relay, and an extension number of each of a plurality of the second telephones;

when the first telephone identification information does not match with any one of pieces of the second telephone identification information registered in the management table, and the first accommodation position information matches with one of the pieces of the second accommodation position information registered in the management table, changing second telephone identification information that forms a set with the matched second accommodation position information, to the first telephone identification information in the management table, and using an extension number that forms the set with the matched second accommodation position information as an extension number of the first telephone; and when the first telephone identification information matches with one of pieces of the second telephone identification information registered in the management table, and the first accommodation position information does not match with the second accommodation position information that forms a set with the matched second telephone identification information, changing the second accommodation position information that forms the set with the matched second telephone identification information, to the first accommodation position information in the management table, and using an extension number that forms the set with the matched second telephone identification information as an extension number of the first telephone.

(Supplementary Note 19)

The telephone exchanging program according to Supplementary Note 16 or 18, before the second telephone identification information that forms the set with the matched second accommodation position information is changed to the first telephone identification information, an execution confirmation notification of data transfer is made to the first telephone, and, when a response to execution of the data transfer is received, the second telephone identification information is changed to the first telephone identification information.

(Supplementary Note 20)

The telephone exchanging program according to Supplementary Note 17 or 18, before the second accommodation position information that forms the set with the matched second telephone identification information is changed to the first accommodation position information, an execution confirmation notification of data transfer is made to the first telephone, and, when a response to execution of the data transfer is received, the second accommodation position information is changed to the first accommodation position information.

INDUSTRIAL APPLICABILITY

The present invention is used for a telephone system, an exchange, a telephone exchanging method and a telephone exchanging program which automatically transfer data accompanying telephone exchange.

REFERENCE SIGNS LIST

10 EXCHANGE
20A-1 to 20A-n, 20B-1 to 20B-n IP TELEPHONE
30A, 30B SWITCHING HUB
40 LAN LINE
101 CONTROL DEVICE
102 COMMUNICATION INTERFACE
103 MEMORY
104 TELEPHONE EXCHANGE DECISION PROCESSING UNIT
105 DATA TRANSFER PROCESSING UNIT
201 CONTROL DEVICE
202 COMMUNICATION INTERFACE

The invention claimed is:

1. A telephone system comprising:
a first telephone;
a relay that is connected with the first telephone, and manages first accommodation position information which indicates information of a position of a port that the first telephone is connected in the relay; and
an exchange that includes a management table that manages as a set at least second telephone identification information, second accommodation position information which indicates information of a position of a port that a second telephone is connected in the relay, and an extension number of each of a plurality of the second telephones including the second telephone,
wherein the exchange receives a registration request including first telephone identification information and the first accommodation position information of the first telephone, searches in the management table based on the first telephone identification information and the first accommodation position information, and, when the first telephone identification information does not match with the second telephone identification information registered in the management table, and the first accommodation position information matches with the second accommodation position information registered in the management table, changes second telephone identification information that forms a set with the matched second accommodation position information, to the first telephone identification information in the management table, and uses an extension number that forms the set with the matched second accommodation position information as an extension number of the first telephone.

2. A telephone system comprising:
a first telephone;
a relay that is connected with the first telephone, and manages first accommodation position information which indicates information of a position of a port that the first telephone is connected in the relay; and an exchange that includes a management table that manages as a set at least second telephone identification information, second accommodation position information which indicates information of a position of a port that a second telephone is connected in the relay, and an extension number of each of a plurality of second telephones including the second telephone, wherein the exchange receives a registration request including first telephone identification information and the first accommodation position information of the first telephone, searches in the management table based on the first telephone identification information and the first accommodation position information, and, when the first telephone identification information matches with the second telephone identification information registered in the management table, and the first accommodation position information does not match with second accommodation position information that forms a set with the matched second telephone identification information, changes the second accommodation position information that forms the set with the matched second telephone identification information, to the first accommodation position information in the management table, and uses an extension number that forms the set with the matched second telephone identification information as an extension number of the first telephone.

3. A telephone exchanging method of an exchange of a telephone system that comprises:

a first telephone;

a relay that is connected with the first telephone, and manages first accommodation position information which indicates information of a position of a port that the first telephone is connected in the relay; and the exchange that includes a management table that manages as a set at least second telephone identification information, second accommodation position information which indicates information of a position of a port that a second telephone is connected in the relay, and an extension number of each of a plurality of the second telephones including the second telephone, the telephone exchanging method comprising at the exchange:

receiving a registration request including first telephone identification information and the first accommodation position information of the first telephone;

searching in the management table based on the first telephone identification information and the first accommodation position information; and when the first telephone identification information does not match with the second telephone identification information registered in the management table, and the first accommodation position information matches with the second accommodation position information registered in the management table, changing second telephone identification information that forms a set with the matched second accommodation position information, to the first telephone identification information in the management table, and using an extension number that forms the set with the matched second accommodation position information as an extension number of the first telephone.

4. A telephone exchanging method of an exchange of a telephone system that comprises:

a first telephone;

a relay that is connected with the first telephone, and manages first accommodation position information which indicates information of a position of a port that the first telephone is connected in the relay; and the exchange that includes a management table that manages as a set at least second telephone identification information, second accommodation position information which indicates information of a position of a port that a second telephone is connected in the relay, and an extension number of each of a plurality of the second telephones including the second telephone, the telephone exchanging method comprising at the exchange:

receiving a registration request including first telephone identification information and the first accommodation position information of the first telephone, searching in the management table based on the first telephone identification information and the first accommodation position information; and when the first telephone identification information matches with the second telephone identification information registered in the management table, and the first accommodation position information does not match with second accommodation position information that forms a set with the matched second telephone identification information, changing the second accommodation position information that forms the set with the matched second telephone identification information, to the first accommodation position information in the management table, and using an extension number that forms the set with the matched second telephone identification information as an extension number of the first telephone.

5. An exchange comprising:

hardware, including a processor and a memory;

a communication interface that is implemented at least by the hardware and that receives a registration request including first accommodation position information which indicates information of a position of a port that a first telephone is connected in a relay and first telephone identification information of the first telephone in the relay connected with the first telephone;

a management table that manages as a set at least second telephone identification information, second accommodation position information which indicates information of a position of a port that a second telephone is connected in the relay, and an extension number of each of a plurality of the second telephones including the second telephone; and a processing unit that is implemented at least by the hardware and that, when the registration request is received, searches in the management table based on the first telephone identification information and the first accommodation position information, and, when the first telephone identification information does not match with the second telephone identification information registered in the management table, and the first accommodation position information matches with the second accommodation position information registered in the management table, changes second telephone identification information that forms a set with the matched second accommodation position information, to the first telephone identification information in the management table, and uses an extension number that forms the set with the matched second accommodation position information as an extension number of the first telephone.

6. An exchange comprising:

hardware, including a processor and a memory;

a communication interface that is implemented at least by the hardware and that receives a registration request including first accommodation position information which indicates information of a position of a port that a first telephone is connected in a relay and first telephone identification information of the first telephone in the relay connected with the first telephone;

a management table that manages as a set at least second telephone identification information, second accommodation position information which indicates information of a position of a port that a second telephone is connected in the relay, and an extension number of each of a plurality of the second telephones including the second telephone; and a processing unit that is implemented at least by the hardware and that, when the registration request is received, searches in the management table based on the first telephone identification information and the first accommodation position information, and, when the first telephone identification information matches with the second telephone identification information registered in the management table, and the first accommodation position information does not match with second accommodation position information that forms a set with the matched second telephone identification information, changes the second accommodation position information that forms the set with the matched second telephone identification information, to the first accommodation position information in the management table, and uses an extension number that forms the set with the matched second telephone identification information as an extension number of the first telephone.

7. A non-transitory computer readable medium storing a telephone exchanging program causing a computer that is an exchange to execute:

receiving a registration request including first accommodation position information which indicates information of a position of a port that a first telephone is connected in a relay and first telephone identification information of the first telephone in the relay connected with the first telephone;

searching in a management table based on the first telephone identification information and the first accommodation position information, the management table managing as a set at least second telephone identification information, second accommodation position information which indicates information of a position of a port that a second telephone is connected in the relay, and an extension number of each of a plurality of the second telephones including the second telephone; and when the first telephone identification information does not match with the second telephone identification information registered in the management table, and the first accommodation position information matches with the second accommodation position information registered in the management table, changing second telephone identification information that forms a set with the matched second accommodation position information, to the first telephone identification information in the management table, and using an extension number that forms the set with the matched second accommodation position information as an extension number of the first telephone.

8. A non-transitory computer readable medium storing a telephone exchanging program causing a computer that is an exchange to execute:

receiving a registration request including first accommodation position information which indicates information of a position of a port that a first, telephone is connected in a relay and first telephone identification information of the first telephone in the relay connected with the first telephone;

searching in a management table based on the first telephone identification information and the first accommodation position information, the management table managing as a set at least second telephone identification information, second accommodation position information which indicates information of a position of a port that a second telephone is connected in the relay, and an extension number of each of a plurality of the second telephones including the second telephone; and when the first telephone identification information matches with the second telephone identification information registered in the management table, and the first accommodation position information does not match with the second accommodation position information that forms a set with the matched second telephone identification information, changing the second accommodation position information that forms the set with the matched second telephone identification information, to the first accommodation position information in the management table, and using an extension number that forms the set with the matched second telephone identification information as an extension number of the first telephone.

* * * * *

UNITED STATES PATENT AND TRADEMARK OFFICE
CERTIFICATE OF CORRECTION

PATENT NO. : 10,305,852 B2
APPLICATION NO. : 15/567456
DATED : May 28, 2019
INVENTOR(S) : Kazuki Nagai Page 1 of 1

It is certified that error appears in the above-identified patent and that said Letters Patent is hereby corrected as shown below:

In the Claims

Column 24, Line 21; In Claim 8, delete "first," and insert --first-- therefor

Signed and Sealed this
Twenty-seventh Day of August, 2019

Andrei Iancu
*Director of the United States Patent and Trademark Office*